United States Patent Office 3,144,397
Patented Aug. 11, 1964

3,144,397
CHEMICAL MANUFACTURE OF GERMANIUM AND ITS COMPOUNDS
Jiří Štamberg, 2234 Dukla, and Josef Seidl, 1279 Denisova, both of Pardubice, Czechoslovakia
No Drawing. Filed Apr. 26, 1960, Ser. No. 24,658
6 Claims. (Cl. 204—105)

The chemical manufacture of germanium and its compounds in view of the use of germanium as semiconductor in electrotechnics has become of increased significance. Germanium occurs in nature only in raw material with a very poor content of this element; for example, in certain kinds of coal it occurs in quantities of 0.001–0.1% Ge. The main problem of the methods for the production of germanium is therefore its concentration from very dilute solutions. For the industrial manufacture of germanium-compounds from coal, so called "fly ash" is usually used; in this material germanium is present in higher concentration than in the original coal. The ash containing Ge is decomposed by concentrated acids, chiefly hydrochloric acid, or by a combined treatment with alkaline agents and concentrated acids; from the hydrochloric acid extract the Ge is distilled off in the form of $GeCl_4$ together with an azeotropic mixture of hydrochloric acid, containing about 20% of HCl. According to the Ge-content of the raw-material and according to the efficiency of the distillation-equipment, solutions of Ge in 20% hydrochloric acid with a content of 0.1 g./l. Ge, or even less, are obtained. At most a Ge-concentration of 2 g./l. can be reached.

For the isolation of Ge from these solutions, leading to the preparation of pure $GeO_2$—generally known processes are used, but this kind of preparation is relatively expensive and is carried out under conditions, which from a sanitary point of view are harmful. According to the methods known so far, the Ge is precipitated from an acid medium, using solid alkaline sulfide, as $GeS_2$; this is decomposed with concentrated nitric acid, and after evaporation and calcination transformed to $GeO_2$. In this way only a technically pure product is obtained, containing some tenths of a percent of As. Therefore, a further purification of the technical product is necessary, for instance by dissolving it in a solution of oxalic acid and ammonium oxalate, reducing the present As by the addition of a saturated solution of sulfurous acid to its trivalent form, precipitating the As as $As_2S_3$ with hydrogen sulfide, and filtering it off. The residual Ge is evaporated in the presence of oxidizing agents and freshly calcinated to $GeO_2$.

In a similar way, that is by azeotropic distillation with hydrochloric acid, the Ge is isolated from the accompanying elements when other raw-materials are treated, for instance in the processing of zinc ores, waste-products from the manufacture of sulfuric acid, and other materials.

The present invention solves the problem of Ge-isolation from its very dilute solutions in nearly concentrated 20% hydrochloric acid, especially from its azeotropic mixtures with water—in a substantially simpler and more economical manner than could previously be done. According to the present invention, the Ge-solutions are filtered using a selective ion-exchanger, which is an artificial resin polycondensate containing as a structural unit a derivate of fluorone of the following formula:

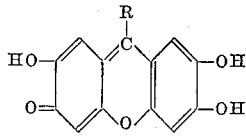

wherein R is a hydroxyphenyl with 1–2 OH groups. These fluorone derivatives are polycondensed with formaldehyde as such or in mixture with monobasic or dibasic phenols, especially with resorcinol. The polycondensation is carried out with the application of heat and acidobasic catalysts. Selective sorption of Ge and in the meantime a separation from As and other elements, present in the hydrochloric solution, takes place on this ion-exchanger. The ion-exchanger is then washed with pure concentrated hydrochloric acid to remove the traces of the adsorbed impurities; hereafter then a desorption of the Ge from the ion-exchanger by means of water is carried out. A concentrate, containing on the average 5–10 g./l. of Ge, is obtained. The trivalent Fe is not adsorbed under the same conditions as Ge on the selective ion-exchanger of the type described. During the sorption-cycle it passes already in the first fractions and very soon an equilibrium of the concentrations is established. The Fe can be easily removed with pure concentrated hydrochloric acid and appears in the following water-eluate only in traces.

If the sorption is carried out with a mixed solution of Fe and Ge, practically only the Ge is retained. By washing the ion-exchanger with pure hydrochloric acid the last traces of Fe are removed and only Ge appears in the water-eluate. Further elements, as for instance Ni, Ca, As in mixed solutions with Ge have a similar behavior. In a noticeable way however, the elements of the fourth group of the periodic system are retained on the ion-exchanger, for instance Sn or Pb, if incidentally present in the Ge-solution. The solutions thus formed, contain furthermore about 0.3% HCl and it is not possible to obtain the $GeO_2$ from them without losses, caused by the volatility of $GeCl_4$. In order to remove the residual HCl, some of the known methods can be used, as for instance the separation of the HCl by means of an anion exchanger or a cation exchanger in silver cycle; the HCl can be also precipitated with silver oxide—but all these methods have their disadvantages. If anion exchangers are used, simultaneously retention of $GeO_2$ takes place; the precipitation of AgCl either on a cation-exchanger or in solution by means of $Ag_2O$ requires an Ag-regeneration.

According to the present invention it is possible to remove the residual HCl advantageously by electrolysis—in two ways. The principle of both these methods is an anodic oxidation of the chlorine-ions at elevated temperatures, to free chlorine, which evaporates. The electrolysis of the solution (of the desorbate) is carried out in an electrolytic cell simply with the anodic and cathodic chambers not being separated, or in an electrolytic cell, the anode and cathode chambers of which are separated by a semipermeable membrane made of some anion exchanger.

In the first case, simultaneously with the evolution of $Cl_2$ on the anode, Ge is separated on the cathode in its elementary form. The separation of Ge is, however, not complete, a small amount of Ge remaining in solution as $GeO_2$. This solution is reused instead of pure water for the desorption of Ge from the saturated ion-exchanger.

In the second case the anodic chamber is filled with the desorbate and the cathodic chamber is filled with a solution of $NH_4OH$. The semipermeable membrane prevents the penetration of the Ge-cations to the cathode; $H_2$ is evolved on the cathode, the whole quantity of Ge remaining in the anodic solution as $GeO_2$. The pure solution of $GeO_2$, free from residual HCl, is afterwards worked up by evaporation. Pure $GeO_2$ is obtained.

In further experiments a selective ion-exchanger based on resorcylfluorone was applied, the latter being a structural unit of the polycondensate and having the following formula:

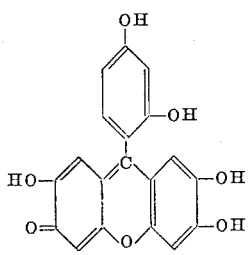

This ion-exchanger has an outstanding ability to bind Ge from solutions containing highly concentrated hydrochloric acid. The effect of the Ge-concentration on the sorption capacity of the ion-exchanger is shown in Table 1. The measurements were carried out using static methods. The respective weighed samples of the centrifuged ion-exchanger were mixed with 100 ml. of $GeO_2$ solution in 20% HCl for 3 hours at 20° C. In the filtrate the Ge-equilibrium-concentration was determined and the sorption capacity calculated from its decrease, in comparsion with the original concentration. The results of the measurements show that within the range of the tested concentrations the sorption isotherm could be expressed by Freundlich's formula for physical adsorption. The table shows that the sorption capacity reaches, even at low concentrations of Ge, practically applicable values.

TABLE NO. 1

| Experiment No. | Weight of centrifuged ion-exchanger in g. | Original Ge-concentration, mg./l. solution | Equilibrium concentration, mg./l. solution | Sorption capacity of centrifuged ion-exchanger, mg. Ge/g. |
| --- | --- | --- | --- | --- |
| 1 | 0.2480 | 6 | 1.2 | 1.92 |
| 2 | 0.2496 | 12 | 2.3 | 3.88 |
| 3 | 0.2483 | 18 | 5.0 | 5.20 |
| 4 | 0.2519 | 24 | 7.8 | 6.48 |
| 5 | 0.2508 | 20 | 11.0 | 7.60 |
| 6 | 0.2508 | 60 | 28.0 | 12.80 |

In neutral aqueous solutions of $GeO_2$ the sorption does not occur. The capacity of the ion-exchanger increases approximately proportionally with the increasing concentration of HCl to reach values of 145–180 g./l. HCl (normality N=4 to 5), when its increase begins to diminish, as can be seen from Table No. 2.

The measurements were carried out in the same way as for the determination of the effect of Ge-concentration on the sorption-capacity.

TABLE NO. 2

| Experiment No. | Weight of the centrifuged ion-exchanger in g. | Concentration (normality) HCl N | Equilibrium concentration of Ge mg./l. solution | Sorption capacity of centrifuged ion-exchanger, mg. Ge/g. |
| --- | --- | --- | --- | --- |
| 1 | 0.3132 | 0.30 | 32.5 | 0.80 |
| 2 | 0.3008 | 1.01 | 30.0 | 1.67 |
| 3 | 0.3046 | 2.01 | 23.0 | 3.94 |
| 4 | 0.3094 | 2.91 | 21.0 | 4.53 |
| 5 | 0.3031 | 3.87 | 15.5 | 6.43 |
| 6 | 0.3144 | 4.80 | 13.5 | 6.83 |
| 7 | 0.3022 | 5.40 | 13.0 | 7.28 |

From this property of the ion-exchanger ensues the possibility of desorption with water or eventually with dilute alkaline solutions exists.

The significant technical effect of the invention depends upon the fact, that ion-exchangers based on fluorone derivatives are capable of collecting Ge-ions from solutions of very low concentrations even under conditions quite unfavorable for the sorption on ion-exchangers of the usual type or eventually on other known selective ion-exchangers. This is of remarkable importance when the Ge is to be taken up from solutions containing about 20% of HCl, that is—from strongly acid solutions, possibly containing Fe and As. Under such conditions the Ge is taken up also by strongly basic ion-exchangers in the form of complexes with chlorine but simultaneously with Fe and As. The selective ion-exchangers based on fluorone-derivatives collect the Ge under the same conditions with an approximately tenfold capacity, without sorption of Fe and As.

It is furthermore a considerable advantage of the invention that its method is simple, not expensive and is economical; it requires little manual labor and is not objectionable from a hygienic point of view. The purity of the Ge depends somewhat on the composition and purity of the original Ge-solution, and is in all cases very high.

*Examples*

(1) As selective ion-exchanger, an ion-exchanger is used prepared from resorcylfluorone which is condensed with formaldehyde in alkaline medium at elevated temperatures; the resin thus formed is washed and adjusted in wet state to a grain size of 0.25–0.5 mm.

The distillate containing 0.1 g./l. Ge in 20% hydrochloric acid is allowed to pass over a column filled with 5 l. of the selective ion-exchanger mentioned above, its specific charge being 5 l. of the Ge-solution to 1 l. of the ion-exchanger per hour. 400 l. of the distillate are allowed to pass, from which quantity 40 g. of Ge are taken up. After the sorption, the layer of the ion-exchanger is washed with 5–10 l. of pure 20% hydrochloric acid; operating this way the traces of Fe are removed.

Thereafter distilled water is allowed to pass through the column containing the ion-exchanger—again with a specific charge of 5 l. water to 1 l. of the ion-exchanger per hour; when the concentration of HCl drops below 3%, the fractions containing Ge are collected. 10–15 l. of a solution are obtained, containing on the average 2.5–4 g./l. Ge and 0.3–0.5% HCl. After the desorption with pure water, the ion-exchanger column is ready for the next sorption.

The solution obtained by desorption is submitted to anodic oxidation in an electrolytic cell, in order to remove the residual HCl, which would hamper the further working up of the solution to $GeO_2$. The electrolysis can be carried out in two ways: the anodic and cathodic chambers are either not separated, or they are separated by a semipermeable membrane. Working without the separation of the anodic and cathodic chambers, $Cl_2$ is evolved on the anode and simultaneously Ge in elementary form on the cathode. After the decomposition of HCl, the remaining electrolyte contains Ge in the form of a solution of $GeO_2$—the Ge having not completely separated on the cathode. This solution is reused, in the next cycle for the desorption of the Ge from the selective ion-exchanger, instead of pure water, in order to obtain desorbates of a higher Ge-content.

Carrying out the electrolysis in a cell where the anode and cathode chambers are separated, a semipermeable membrane for their separation is used, consisting of some of the anion-exchangers. The anode chamber is filled with the desorbate with the Ge content, the cathode chamber is filled with a 0.5% solution of $NH_3$ in water. This prevents the penetration of the Ge in cationic form to the cathode and all the Ge, liberated from the HCl by anodic oxidation remains in the anode-chamber in the form of $GeO_2$; in this case only $H_2$ is evolved on the cathode. The anolyte can be worked up to $GeO_2$ by water evaporation, or if it is too diluted, it can be used for a further desorption.

We claim:
1. The method of recovering germanium from an aqueous concentrated hydrochloric acid solution containing a low concentration of germanium ions and also containing iron ions, which comprises passing said solution through an ion exchanger resin consisting essentially of the polycondensation reaction product of formaldehyde and a fluorone derivative of the formula:

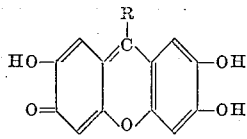

wherein R is selected from the group consisting of monohydroxyphenyl and dihydroxyphenyl, said ion exchange resin being specific for germanium ions, so as to cause selective adsorption of said germanium ions by said ion exchange resin while said iron ions pass through and are not adsorbed by said ion exchange resin.

2. The method of recovering germanium from an aqueous concentrated hydrochloric acid solution containing a low concentration of germanium ions and also containing iron ions, which comprises passing said solution through an ion exchange resin consisting essentially of the polycondensation reaction product of formaldehyde and a fluorone derivative of the formula:

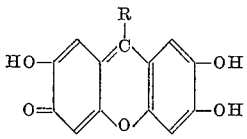

wherein R is selected from the group consisting of monohydroxyphenyl and dihydroxyphenyl, said ion exchange resin being specific for germanium ions, so as to cause selective adsorption of said germanium ions by said ion exchange resin while said iron ions pass through and are not adsorbed by said ion exchange resin; and washing said ion exchange resin containing adsorbed germanium with concentrated hydrochloric acid so as to remove any adhering traces of iron.

3. The method of recovering germanium from an aqueous concentrated hydrochloric acid solution containing a low concentration of germanium ions and also containing iron ions, which comprises passing said solution through an ion exchange resin consisting essentially of the polycondensation reaction product of formaldehyde and a fluorone derivative of the formula:

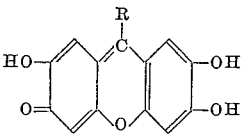

wherein R is selected from the group consisting of monohydroxyphenyl and dihydroxyphenyl, said ion exchange resin being specific for germanium ions, so as to cause selective adsorption of said germanium ions by said ion exchange resin while said iron ions pass through and are not adsorbed by said ion exchange resin; washing said ion exchange resin containing adsorbed germanium with concentrated hydrochloric acid so as to remove any adhering traces of iron; and washing the thus obtained ion exchange resin containing adsorbed germanium with water so as to desorb said germanium from said ion exchange resin by causing dissolution of said germanium in said water.

4. The method of recovering germanium from an aqueous concentrated hydrochloric acid solution containing a low concentration of germanium ions and also containing iron ions, which comprises passing said solution through an ion exchange resin consisting essentially of the polycondensation reaction product of formaldehyde and a fluorone derivative of the formula:

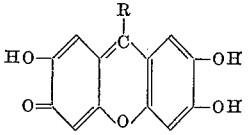

wherein R is selected from the group consisting of monohydroxyphenyl and dihydroxyphenyl, said ion exchange resin being specific for germanium ions, so as to cause selective adsorption of said germanium ions by said ion exchange resin while said iron ions pass through and are not adsorbed by said ion exchange resin; washing said ion exchange resin containing adsorbed germanium with concentrated hydrochloric acid so as to remove any adhering traces of iron; washing the thus obtained ion exchange resin containing adsorbed germanium with water so as to desorb said germanium from said ion exchange resin by causing dissolution of said germanium in said water; and subjecting the thus obtained aqueous solution to electrolytic anodic oxidation so as to remove any residual hydrogen chloride therefrom.

5. The method of recovering germanium from an aqueous concentrated hydrochloric acid solution containing a low concentration of germanium ions and also containing iron ions, which comprises passing said solution through an ion exchange resin consisting essentially of the polycondensation reaction product of formaldehyde and a fluorone derivative of the formula:

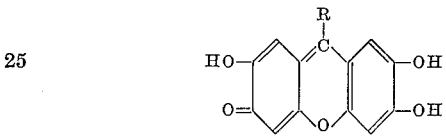

wherein R is selected from the group consisting of monohydroxyphenyl and dihydroxyphenyl, said ion exchange resin being specific for germanium ions, so as to cause selective adsorption of said germanium ions by said ion exchange resin while said iron ions pass through and are not adsorbed by said ion exchange resin; washing said ion exchange resin containing adsorbed germanium with concentrated hydrochloric acid so as to remove any adhering traces of iron; washing the thus obtained ion exchange resin containing adsorbed germanium with water so as to desorb said germanium from said ion exchange resin by causing dissolution of said germanium in said water; and subjecting the thus obtained aqueous solution to electrolysis in an electrolytic cell comprising a cathode chamber and an anode chamber wherein said chambers are separated by a semi-permeable membrane and wherein the anode chamber contains said aqeous solution and the cathode chamber contains dilute ammonium hydroxide, thereby causing chlorine from any residual hydrogen chloride to be evolved at the anode while said germanium remains in solution in the form of $GeO_2$.

6. The method of recovering germanium from an aqueous concentrated hydrochloric acid solution containing a low concentration of germanium ions and also containing iron ions, which comprises passing said solution through an ion exchange resin consisting essentially of the polycondensation reaction product of formaldehyde and a fluorone derivative of the formula:

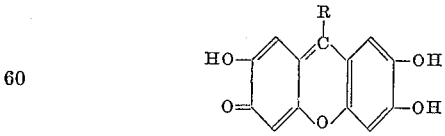

wherein R is selected from the group consisting of monohydroxyphenyl and dihydroxyphenyl, said ion exchange resin being specific for germanium ions, so as to cause selective adsorption of said germanium ions by said ion exchange resin while said iron ions pass through and are not adsorbed by said ion exchange resin; washing said ion exchange resin containing adsorbed germanium with concentrated hydrochloric acid so as to remove any adhering traces of iron; washing the thus obtained ion exchange resin containing adsorbed germanium with water so as to desorb said germanium from said ion exchange resin by causing dissolution of said germanium in said water; and subjecting the thus obtained aqueous solution to electrolysis in an electrolytic cell comprising a cathode chamber and an anode chamber wherein said chambers are separated by a semi-permeable membrane formed of an ion exchange resin and wherein the anode chamber contains said aqueous solution and the cathode chamber contains dilute ammonium hydroxide, thereby causing chlorine from any residual hydrogen chloride to be evolved at the anode while said germanium remains in solution in the form of $GeO_2$.

References Cited in the file of this patent

UNITED STATES PATENTS

| | | |
|---|---|---|
| 679,824 | Betts | Aug. 6, 1901 |
| 1,336,281 | Cataldi | Apr. 6, 1920 |
| 1,986,920 | Cross | Jan. 8, 1935 |
| 2,011,882 | Teats | Aug. 20, 1935 |
| 2,258,963 | Wall et al. | Oct. 14, 1941 |
| 2,586,883 | Stroh | Feb. 26, 1952 |
| 2,739,882 | Ellis | Mar. 27, 1956 |
| 2,750,347 | Bunnett | June 12, 1956 |
| 2,810,686 | Bodamer | Oct. 22, 1957 |

OTHER REFERENCES

Journal of Chemical Society (London), 1954 (pages 2438–43).

Trans. Electrochemical Society, vol. 65, 1934, pp. 215–19.